United States Patent [19]

Jones et al.

[11] Patent Number: 4,566,884
[45] Date of Patent: Jan. 28, 1986

[54] VACUUM CLEANER BAG SUPPORT

[75] Inventors: John E. Jones, Greenville; W. K. Glenn, III, Anderson, both of S.C.

[73] Assignee: The Singer Company, Stamford, Conn.

[21] Appl. No.: 605,008

[22] Filed: Jul. 16, 1984

Related U.S. Application Data

[63] Continuation of Ser. No. 407,536, Aug. 12, 1982, abandoned.

[51] Int. Cl.⁴ .............................................. B01D 46/02
[52] U.S. Cl. ........................................ 55/357; 15/350; 55/369; 55/379; 55/473; 55/508; 55/DIG. 3
[58] Field of Search ................. 55/357, 369, 370, 371, 55/374, 375, 378, 379, 508, DIG. 3, 365, 472, 473; 15/351, 350

[56] References Cited

U.S. PATENT DOCUMENTS

| | | | |
|---|---|---|---|
| 1,936,761 | 11/1933 | Hoover | 15/351 X |
| 2,010,898 | 8/1935 | Ruemelin | 55/379 |
| 2,073,489 | 3/1937 | Leathers . | |
| 2,352,504 | 6/1944 | White | 55/375 X |
| 2,738,538 | 3/1956 | Vance | 15/351 |
| 2,829,734 | 4/1958 | Brace | 55/371 |
| 3,277,634 | 10/1966 | Wheaton | 55/379 X |
| 4,342,575 | 8/1982 | Scott | 55/378 |

Primary Examiner—Kathleen J. Prunner
Attorney, Agent, or Firm—Edward P. Schmidt; Robert E. Smith; Edward L. Bell

[57] ABSTRACT

A vacuum cleaner bag support in which a compression spring is itself supported in the interior of the upper terminus of an outer bag and carries a bag top support which resiliently maintains the bag elevated against lateral expansion thereof. An ornamental bag top member may be carried on the upper terminus of the outer bag and attached to the bag top support for movement therewith.

2 Claims, 4 Drawing Figures

U.S. Patent
Jan. 28, 1986
4,566,884
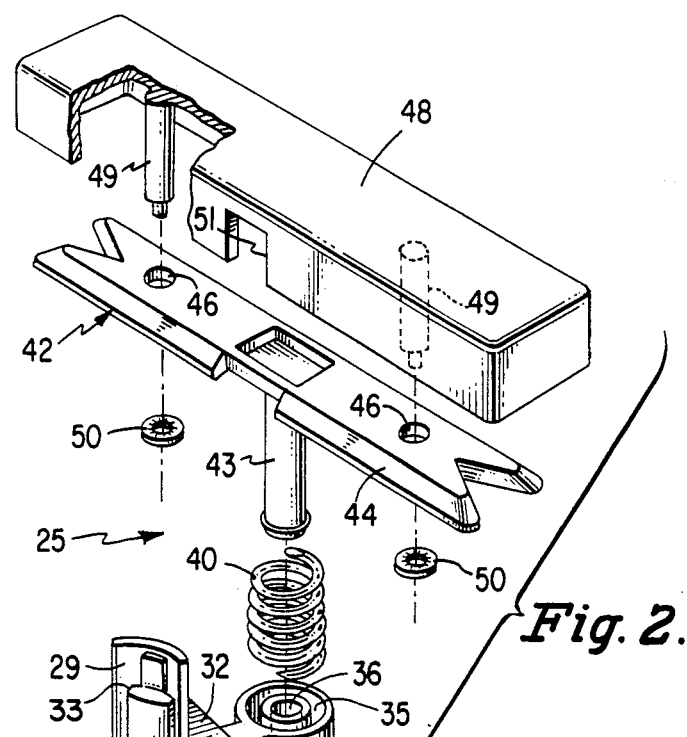
*Fig.1.*
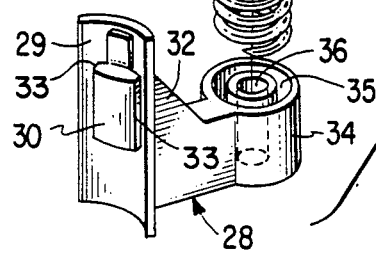
*Fig.2.*
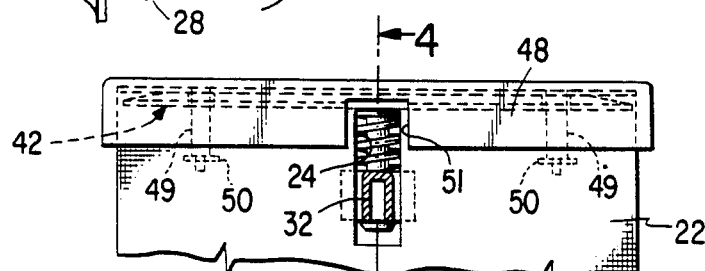
*Fig.3.*
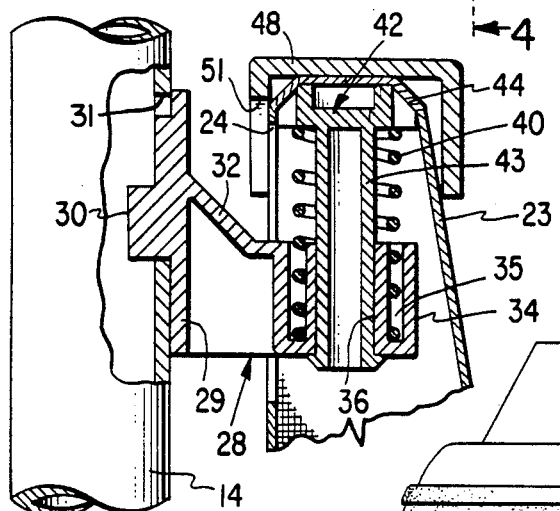
*Fig.4.*
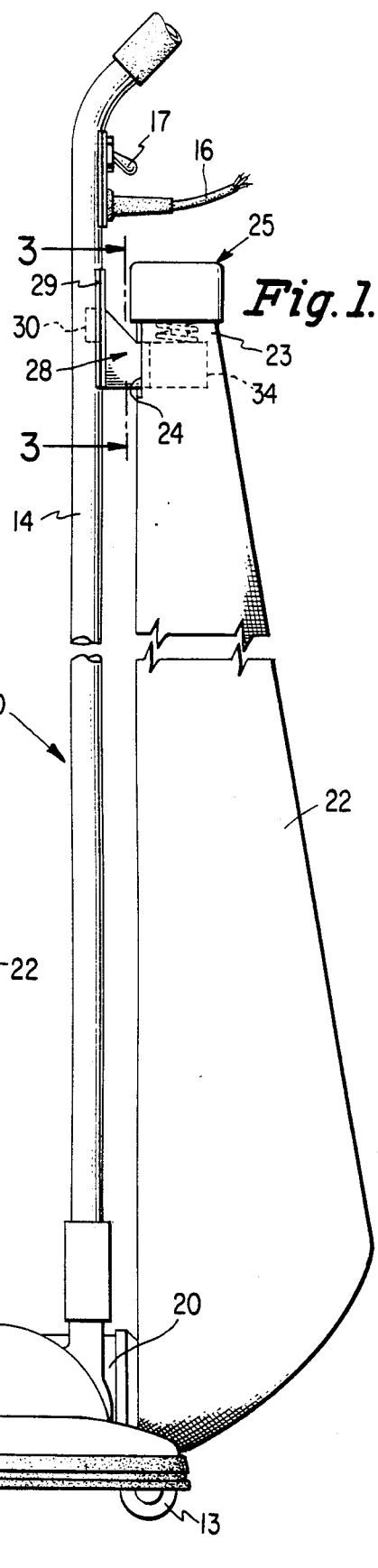

VACUUM CLEANER BAG SUPPORT

This application is a continuation of application Ser. No. 407,536 filed Aug. 12, 1982 and now abandoned.

DESCRIPTION

BACKGROUND OF THE INVENTION

This invention is in the field of vacuum cleaners; more particularly it relates to a means for suspending an outer bag of an upright vacuum cleaner to maintain its taut relationship to the handle.

In the prior art it has been quite common to close the upper end of the outer bag of the vacuum cleaner by means of a clip which is further connected to the handle of the vacuum cleaner through an extension spring. The extension spring maintains the outer bag in taut relationship to the handle yet provides for the necessary movement when the inner bag fills with air and dust in operation. The common prior art design has been adequate to perform its function but there have been drawbacks noticed. For example, in some designs, the flexibility required of the extension spring has allowed the outer bag to move considerably and catch upon articles of furniture, frequently distorting the spring. In order to avoid this drawback, some designs were proposed which contained the extension spring and limited its lateral movement. However, in these latter designs, attachment of the extension spring to the outer bag was proportionally more difficult, and, in any event, the clip and connection to the outer bag were still much in evidence.

What is required is some means of maintaining the outer bag taut at all times without permitting overextension thereof, which means should also be aesthetically pleasing.

SUMMARY OF THE INVENTION

The above desired requirements are shown in the invention in which a bag support is connected to the upper portion of a vacuum cleaner handle, adjacent the controls thereof. The bag support extends through a slot in the outer bag to maintain a spring socket and support post guide inside the outer bag. A bag top support is situated inside the top of the outer bag and is formed with a post which extends through a compression spring which is supported in the spring socket and support post guide and through an opening in the support post guide. A bag top may be formed with an asethetically pleasing outer shape and a downwardly open interior to accommodate the top of the outer bag and may be formed with two pins which extend through the outer bag and through openings therefore in the bag top support to be retained thereto by spring nuts. Expansion of a dust collecting inner bag will expand the outer bag and move the bag top support downwardly against the urgings of the compression spring. The compression spring is made a sufficient length to accommodate the required downward movement of the outer bag.

DESCRIPTION OF THE DRAWINGS

The novel features which are considered as characteristic for the invention are set forth in particular in the appended claims. The invention itself, however, both as to its construction and its method of operation, together with additional objects and advantages thereof, will best be understood from the following description of a specific embodiment when read in conjunction with the accompanying drawings in which:

FIG. 1 is a side elevational view of an upright vacuum cleaner with its dust collecting bag attached with the use of this invention;

FIG. 2 is an exploded view of the upper support in order to more clearly show details thereof;

FIG. 3 is a view of the upper support taken substantially along the line 3—3 of FIG. 1; and, FIG. 4 is a cross-section of the upper support taken substantially along line 4—4 of FIG. 3.

Referring to FIG. 1, there is shown a portion of an upright vacuum cleaner 10 to which the invention has been applied. The upright vacuum cleaner 10 includes a chassis 12 adapted to be propelled along a floor on wheels 13 only two of which are shown. A handle 14 is swiveled to the chassis 12 and extends upwardly therefrom and is subject to the manipulation of an operator in propelling and directing the chassis 12. As is visible in FIG. 1, an electric cord 16 extends to the handle beneath a switch 17, and may further extend through the handle 14 to the chassis 12 which supports therein, in the usual fashion, a motor, brush and blower assembly for pick up of dirt from the surface which the chassis is guided over.

The chassis 12 is formed with an outlet plenum 20 to which is connected the bottom end of an outer bag 22. The outer bag extends upwardly adjacent the handle 14 to its upper terminus 23 in an upper support 25 therefor which retains the outer bag taut with respect to the handle 14 but able resiliently to undergo limited motion with respect to the handle.

By referring to FIG. 2, further details of the upper support 25 will become apparent. The upper support includes bag support 28 which is fashioned with a connector 29 adapted to be attached to the handle 14 in any suitable manner. In the instant invention, the handle 14 is fashioned with a longitudinal slot 31 which together with a lug 30 projecting from connector 29 comprise cooperating means for removably securing said bag upper support to said handle. The longitudinal slot 31 may have an enlarged portion (not shown) through which the lug 30 may extend. The bag support 28 may be slid downwardly on handle 14 into a narrower portion of the slot (not shown) with the ears 33 of the lug 30 captured internally of the handle 14 behind the slot. The connector portion 29 may be contoured to fit closely adjacent the handle 14. The bag support 28 is further formed with an extension 32 from the connector 29 to a spring socket and support post guide 34, below the level of the upper terminus 23 of the collecting bag 22. The spring socket and support post guide 34 is deeply grooved as at 35 for the purpose of accepting a compression spring 40. The central portion of the spring socket and support post guide is apertured as at 36 for a purpose which will become apparent below.

A bag top support 42 is provided with a downwardly extending post 43 which is received in the aperture 36 in the spring socket and support post guide 34. The post 43 also extends through the compression spring 40 which extends between the bottom surface of the bag top support 42 and the groove 35 in the spring socket and support post guide 34 in which it is seated. The bag top support 42 is further formed with beveled upper edges 44 which engage with the inside surface of the outer bag 22 at the upper terminus 23 thereof (see FIG. 4). The bag top support 42 is further fashioned with a pair of spaced apertures 46 for a purpose to be explained below. To provide a cover on the top of the bag, a bag top 48 is provided which may be fashioned with an asethetically pleasing outer surface appearance, which as shown particularly in FIGS. 1 and 4, is uninhibited by presence of any means connecting said bag top 48 outer surface with said handle. The bag top 48 is fashioned with a downwardly opened inner surface to accommodate the upper terminus 23 of the outer bag 22 with the bag top support 42 therein. The bag top 48 is partially broken away to disclose one of a pair of downwardly extending pins 49 which may extend through apertures (not shown) in the outer bag 22 into the spaced apertures 46 in the bag top support 42. In this fashion, the bag top 48 may be retained in position by the insertion of spring nuts 50 over the pins 49. The bag top 48 is further formed with a slot 51 in order to accommodate travel of the bag top 48 below a position where the skirts thereof would interfere with the extension 32 of the bag support 28. From an inspection of FIG. 3, it will be apparent that the outer bag 22 at the upper terminus 23 thereof is also fashioned with a slot 24 so as also to be able to accommodate travel of the outer bag about the extension 32 of the bag support 28.

In operation, as the outer bag 22 expands from pressure of the air coming from the outlet plenum 20 and due to weight of dirt carried in the filter bag therein, the change in weight and/or geometry thereof may be accommodated by the compression spring 40 which is fashioned with an adequate spring constant and compressibility in order to readily accommodate the normal loading for devices of this sort. In the event that an unusually heavy loading is encountered, it will be apparent by inspection of FIG. 4 that the spring 40 may be compressed to the point where the bag top support 42 impinges upon the spring socket and support post guide 34 of the bag support 28 thereby limiting further loading of the spring. This construction thus avoids the inordinate extension caused in the prior art extension springs which contributed to their destruction, and provides an entirely pleasing appearance when compared with the prior art.

Other applications of this invention may be made. By illustrating the one herein described, it is not intended thereby to limit the scope of this invention. For example, it will be understood that an arrangement may be provided which substitutes a leaf spring in place of the compression spring 40 to accomplish the identical purpose thereof. Other changes may be made in the construction with the scope of the invention which is set forth in the appended claims.

I claim:

1. An upright vacuum cleaner having a chassis movably supported on the floor, a handle pivotally attached thereto and extending upwardly therefrom, a bag extending from said chassis upwardly adjacent said handle to an upper terminus thereof, and means for detachably securing said bag to said handle comprising:
   a bag support having a connector portion and an extension from said connector portion,
   cooperating means on said handle and on the connector portion of said bag support for removably securing said bag support to said handle,
   said bag being formed at said upper terminus with a slot,
   said bag support extension extending through said collecting bag slot to the interior of said bag,
   a bag top support coextensive with the interior of said upper terminus of said bag and located between said bag upper terminus and said bag support extension,
   said bag top support including a post slidably engaging said bag support extension,
   a compression spring encircling said post and extending between said bag support extension and said bag top support, and
   a cover on the exterior of said upper terminus of said bag of which cover the external shape and appearance is uninhibited by presence of any means connecting said cover with said handle.

2. An upright vacuum cleaner as claimed in claim 1 wherein said cover is received on the exterior of said upper terminus of said bag with said bag top support therein, said cover having an outer surface uninhibited by presence of any means connecting said cover with said handle, and means for connecting said cover to said bag top support for movement therewith.

* * * * *